United States Patent [19]

Courtenay

[11] Patent Number: 4,923,294

[45] Date of Patent: May 8, 1990

[54] LEAD FRAME HOLDING DEVICE

[75] Inventor: Robert W. Courtenay, Boise, Id.

[73] Assignee: Micron Technology, Inc., Boise, Id.

[21] Appl. No.: 260,469

[22] Filed: Oct. 20, 1988

[51] Int. Cl.⁵ ............................................. G02B 21/26
[52] U.S. Cl. .............................. 350/529; 269/254 CS; 350/531; 414/786
[58] Field of Search ............... 350/529, 530, 531, 532, 350/533, 534, 536; 269/254 CS; 414/786, 787

[56] References Cited

U.S. PATENT DOCUMENTS

| 703,047 | 6/1902 | Dieckmann | 350/531 |
|---|---|---|---|
| 2,333,114 | 11/1943 | Meyer | 81/33 |
| 2,471,103 | 5/1949 | Franks et al. | 81/6 |
| 2,474,163 | 6/1949 | Riley | 350/531 |
| 2,486,645 | 11/1949 | Hager | 350/531 |
| 3,088,729 | 5/1963 | Marcus | 269/97 |
| 3,572,888 | 3/1971 | Olympus | 350/531 |
| 4,252,303 | 2/1981 | Shimai | 269/43 |
| 4,255,077 | 3/1981 | Smith | 414/786 |
| 4,407,570 | 10/1983 | Hayasaka | 350/529 |
| 4,508,326 | 2/1985 | Andre | 269/22 |
| 4,711,438 | 12/1987 | Guarino | 269/152 |

FOREIGN PATENT DOCUMENTS 57-96527 6/1982 Japan .

Primary Examiner—Rodney B. Bovernick
Assistant Examiner—Martin Lerner
Attorney, Agent, or Firm—Hopkins, French, Crockett, Springer & Hoopes

[57] ABSTRACT

A device useful to store transport objects retained thereon, and to be retained by the adjustable stage of a microscope for viewing under the microscope. A spring-loaded movable bracket retains the object, such as a lead frame comprising a plurality of semiconductor chips dice, on a planar surface. The movable bracket is affixed to a rod which extends through the device and which manipulates the movable bracket from an open loaded position to a closed position with the object held securely on the device.

11 Claims, 3 Drawing Sheets

LEAD FRAME HOLDING DEVICE

BACKGROUND OF THE INVENTION

This invention relates to an apparatus which enables the placement of one or more lead frames in a lead frame holder such that they may be easily transported and may be affixed to a microscope stage for convenient viewing.

Various means of holding and manipulating objects to be viewed under a microscope are well known to those skilled in the art and who are experienced in the laboratory use of microscopes. For example, most laboratory-grade microscopes are provided with a stage having facilities to move a slide in both the "X" and "Y" axes. Some microscope manufacturers provide one or more slide holders which permit one to store slides between periods of use. However, there is currently no device available which will easily accept lead frames and permit their storage, transportation and viewing under a microscope. As used herein, "lead frame" refers to a conventional manufacturing method whereby a semiconductor chip is affixed to a die having a plurality of electrical leads provided thereon. The dice are manufactured by stamping procedures and any number, typically 6-10, are stamped adjacent and connected to one another. The plurality of dice is called a lead frame.

Generally speaking, holding devices for objects to be viewed under a microscope are restrained vertically; that is, a downward force is applied to the article to be viewed, as with a spring-loaded clamp affixed to the microscope stage. Certain products, for example, lead frames, are highly sensitive and must not be compressed on a microscope stage as set forth above. Any abrasion, particularly to the semiconductor chip, can cause extreme and irreparable damage, resulting in the piece being discarded.

Various devices have been proposed in the prior art for restraining and locating devices. For instance, U.S. Pat. No. 4,255,077, Smith discloses a rectangular board for positioning a printed circuit board relative to an electrical component inserting machine which inserts terminals into predrilled holes in the printed circuit board. Spring-loaded locators and a pair of diagonally opposed right-angle guides accurately center the printed circuit board within acceptable tolerances. U.S. Pat. No. 2,471,103, Franks et al discloses a spring-loaded rod affixed to a pair of pins which slide within the slots of a base plate to effectively restrain a watch case for repairs. Likewise, U.S. Pat. No. 3,088,729, Marcus discloses a quick-acting vise having a pair of jaws which are movably disposed along a track in order to hold objects therebetween. A coil spring is mounted over a rod to tension one of the jaws. A device for adjusting a specimen-holding tool for accurate positioning under a microscope is disclosed in Japanese Pat. No. 57-96527. The specimen-holding tool is compressed and fixed into the appropriate position by vertically and horizontally acting springs. Lastly, a rectangular plate holder for holding multiple sets of masks is disclosed in U.S. Pat. No. 4,711,438. U.S. Pat. No. 2,333,114, Meyer discloses a vise for holding watch pieces having a movable jaw and fixed jaw interconnected by a threaded shaft.

Therefore, there exists a need for a device capable of holding lead frames for transport, storage or viewing under a microscope.

SUMMARY OF THE INVENTION

The invention disclosed herein comprises a device for holding or securing at least one object to a member which may be in turn affixed to a microscope stage. The device has particular applicability in the holding of lead frames comprising a number of dice used in the manufacture of electronic components. Specifically, the device comprises a base member having a handle and at least one set of bracket means for holding the object to be viewed under the microscope. A longitudinal aperture is provided through the handle and base means, with a rod or actuating means disposed within the handle. The actuating means bears against a spring, also disposed within the aperture, the tension on the spring being determined by a plug or adjustment means. A stationary bracket is affixed to the base member and an adjustment bracket is affixed to the rod and slides on the surface of the base member in a slot provided in the base member, which is interconnected with the aperture. A portion of the handle, in the nature of a button, extends beyond the end of the handle, so that be depressing the button, the movable bracket is moved into an "open" position remote from the stationary bracket. By releasing the button, the spring forces the rod and the movable bracket toward the "closed" position closer to the stationary bracket. A lead frame or other device is inserted between the brackets when the movable bracket is in the open position and is restrained between the brackets when the movable bracket is closed. The brackets may be provided with abutting faces of any convenient shape (planar, curved, etc.) to securely hold an article of any shape therebetween.

DETAILED DESCRIPTION OF THE INVENTION

Figure 1:
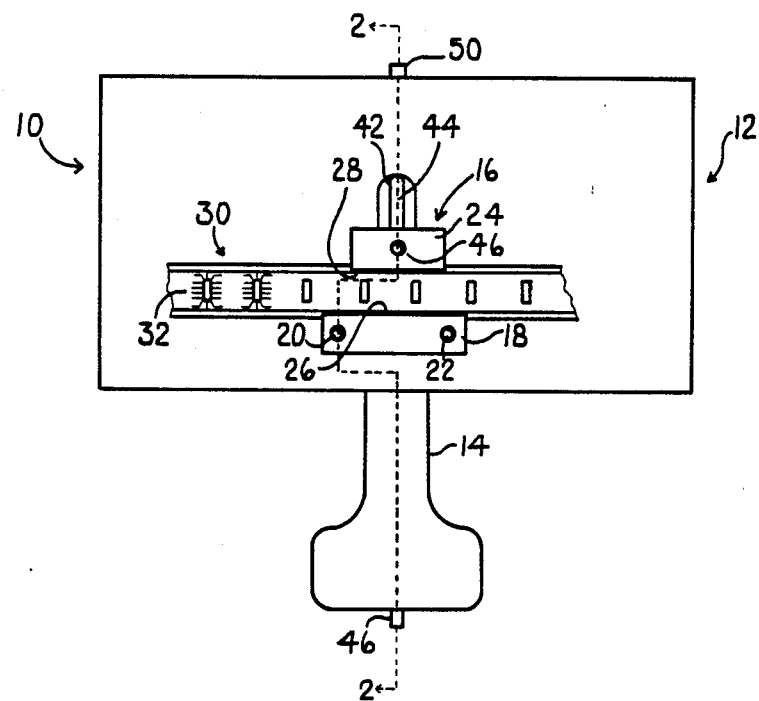
FIG. 1 is a plan view of the apparatus of the present invention.

Referring now to the drawings, and specifically FIG. 1, the device of the present invention, generally designated 10, comprises a base member 12, a handle 14 and a bracket device, generally designated 16. Specifically, the base member comprises a planar member of any convenient size and shape to interfit with the stage of a particular microscope with which the device will be used. For example, while the device of FIG. 1 is illustrated in rectangular format, it may be provided in any convenient shape suitable for use with a particular microscope. The handle 14 may be constructed integrally with the base member 12 or may be affixed thereto by any conventional means well known to those of ordinary skill in the art. While the material of construction is not critical to the functioning of the invention, it most typically would be either milled or aluminum or formed or extruded of polymeric material. The bracket device 16 comprises a stationary bracket 18 affixed to the base member by one or more screws 20, 22, and a movable bracket 24. Both the stationary and movable brackets are provided with opposing faces 26, 28 respectively which are adapted to hold an object therebetween for transport, storage or viewing under a microscope.

As illustrated in FIG. 1, a lead frame 30 comprising a plurality of dies 32 is held therebetween. While the device as illustrated and as described herein has particular relevance in the holding of semiconductor chip lead frames, it is to be understood that this invention is equally useful in the holding of any object for transportation or viewing under a microscope. While the bracket device 16 is illustrated with parallel opposing faces 26, 28, the brackets 18, 24 and their opposing faces could be modified to accept and retain therebetween an article of any shape, including circular.

Figure 2:
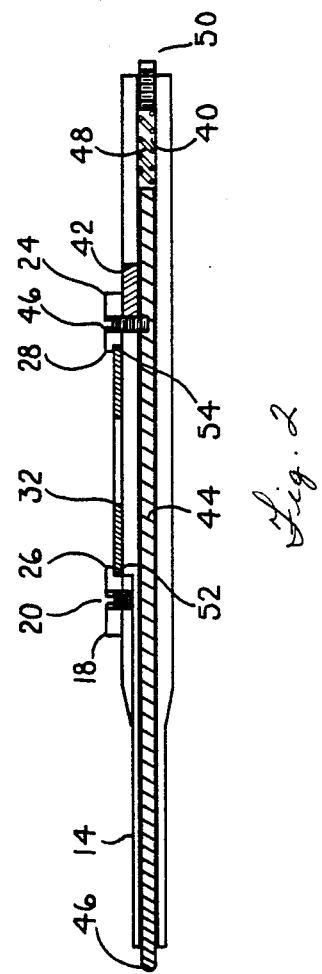
FIG. 2 is a sectional view taken along lines 2—2 of FIG. 1.
Figure 3:
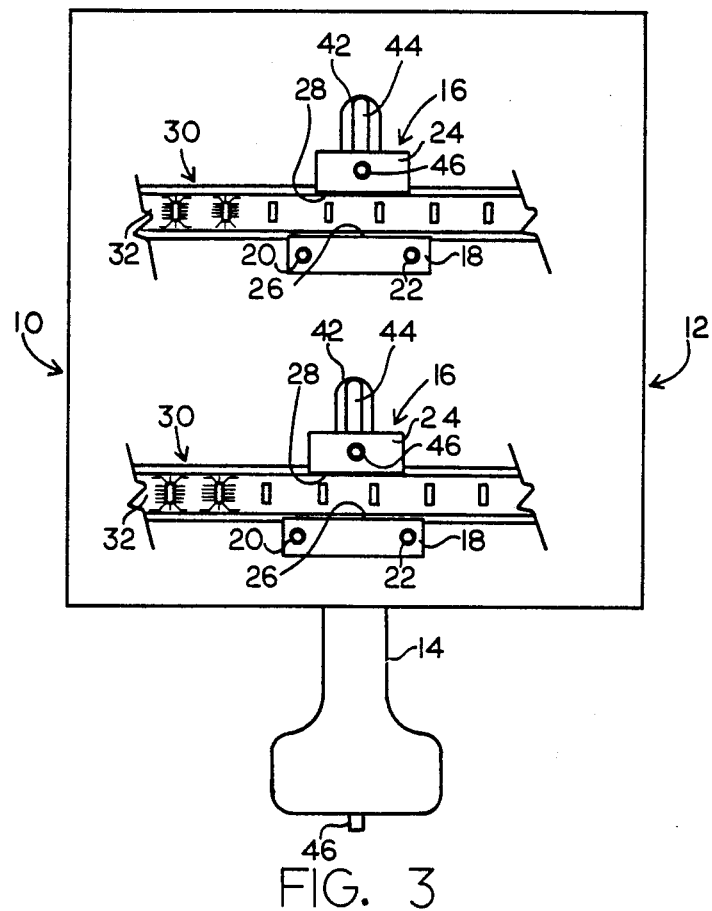

An aperture 40, seen more clearly in FIG. 2, extends through the handle 14 and the base member 12, and through the respective ends thereof. Overlying the aperture 40 in the base member 12 is a slot 42. An elongate rod, for actuating means 44 is positioned within aperture 40. A portion 46 comprising a "button" extends from the end of handle 14. The movable bracket 24 is secured to the actuating means 44 by screw 46. A rod 44 extends into the end of the base member 12 opposite the handle where it is biased against a spring 48. A threaded plug, or adjustment means 50 is threaded into the end of aperture 40 in order to restrain the spring 48 between the plug 50 and rod 44.

In operation, an operator would grasp the device 10 by handle 14 and depress the button 46, thereby moving the movable bracket 24 through slot 42, and biasing the actuating means 44 against spring 40. After the object is placed on the base member between the brackets, the tension is released allowing the bracket 28 to move back to its "closed" position. Brackets 26, 28 may be provided with slots 52, 54 respectively within which the object may be restrained.

While the device of FIGS. 1 and 2 is illustrated with a single set of brackets 16, it should be appreciated that with minor modifications two or more sets of the brackets illustrated in FIG. 1 could easily be affixed to the device.

The device of the present invention can easily be constructed so as to fit within the adjustment apparatus provided on any particular microscope stage. Such stages typically have provision for "X" and "Y" axis adjustment. When affixed to the microscope stage, semiconductor chips on each of the dice may be viewed for detection of scratches, imperfections, chips, etc. If an imperfection is found in one such die, the remainder of the dice on a given lead frame may be easily reviewed on the same axis by merely operating the appropriate microscope stage adjustment. It is to be understood that the device of the present invention, while described in relation to microscopic examination of lead frames, is equally susceptible to use in any number of other environments which will be apparent to those skilled in the art.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

I claim:

1. A lead frame holding device for securing at least one lead frame for microscopic examination and transport, including base means adapted to interfit with a microscope stage, said base means comprising:
    (a) a planar member for securement to the microscope stage and having a longitudinal aperture therethrough said planar member having an upper surface and four lateral edge portions;
    (b) one of said lateral edge portions formed into handle means wherein said longitudinal aperture continues through said handle means;
    (c) the longitudinal aperture extending through a portion of the upper surface of the planar member such that a slot is formed in the planar member;
    (d) a stationary bracket means secured to the upper surface of the planar member;
    (e) movable bracket means movably affixed to the upper surface of the planar member such that the lead frame may be retained between the stationary bracket and the movable bracket; and
    (f) actuating means disposed within the longitudinal aperture through the handle means and through the planar member, with a portion of the actuating means exposed exterior of the handle means.

2. The device as recited in claim 1, wherein the movable bracket means moves across the upper surface of the planar member within the slot.

3. The device as recited in claim 2, wherein the actuating means is affixed to the movable bracket means such that when the actuating means is actuated, the movable bracket is moved within the slot.

4. The device as recited in claim 1, wherein the actuating means bears against a spring disposed within the longitudinal aperture, such that the actuating means and the movable bracket are biased toward the handle.

5. The device as recited in claim 4, wherein adjustment means are provided to vary the tension of the spring against the actuating means.

6. The device as recited in claim 1, wherein a plurality of stationary bracket means and a plurality of movable bracket means are provided such that a plurality of lead frames may be retained therebetween.

7. A lead frame holding device comprising:
    (a) a planar base portion for removable attachment to a microscope stage;
    (b) handle means affixed to the base portion;
    (c) a longitudinal aperture through the base portion and through the handle means;
    (d) actuating means disposed through the longitudinal aperture;
    (e) a plurality of movable bracket means affixed to the actuating means; and
    (f) a plurality of stationary bracket means adapted to retain a plurality of said lead frames between said stationary bracket means and said movable bracket means.

8. The device as recited in claim 7, wherein a slot is provided in the planar base portion overlying the longitudinal aperture and contiguous therewith.

9. The device as recited in claim 9, wherein an actuating means is disposed within the longitudinal aperture and affixed to the movable bracket such that when the actuating means is actuated, the movable bracket is moved within said slot.

10. The device as recited in claim 9, wherein the actuating means bears against a spring disposed within the longitudinal aperture, such that the actuating means and the movable bracket are biased toward the handle.

11. The device as recited in claim 9, wherein adjustment means are provided to vary the tension of the spring against the actuating means.

* * * * *